(12) United States Patent
Riewerts

(10) Patent No.: US 7,735,438 B2
(45) Date of Patent: Jun. 15, 2010

(54) GROUND DRIVEN SEED METERING SYSTEM WITH A CONTINUOUSLY VARIABLE TRANSMISSION

(75) Inventor: Paul R. Riewerts, Port Byron, IL (US)

(73) Assignee: Deere & Company, Moline, IL (US)

( * ) Notice: Subject to any disclaimer, the term of this patent is extended or adjusted under 35 U.S.C. 154(b) by 176 days.

(21) Appl. No.: 11/868,075

(22) Filed: Oct. 5, 2007

(65) Prior Publication Data
US 2009/0090283 A1 Apr. 9, 2009

(51) Int. Cl.
*A01C 7/00* (2006.01)
*A01C 9/00* (2006.01)

(52) U.S. Cl. ..................................................... 111/185

(58) Field of Classification Search ................ 111/900, 111/183–185, 177, 170, 14
See application file for complete search history.

(56) References Cited

U.S. PATENT DOCUMENTS

| 2,923,444 | A | 2/1960 | Orendorff |
| 4,122,974 | A | 10/1978 | Harbert et al. ................. 221/13 |
| 4,314,515 | A * | 2/1982 | Jimenez et al. ............. 111/177 |
| 4,600,122 | A | 7/1986 | Lundie et al. |
| 4,779,471 | A | 10/1988 | Rettig ............................. 74/13 |
| 4,875,421 | A | 10/1989 | Hadley ........................ 111/200 |
| 5,347,939 | A * | 9/1994 | Hood et al. .................... 111/36 |
| 5,632,212 | A | 5/1997 | Barry ........................ 111/200 |
| 5,646,846 | A | 7/1997 | Bruce et al. ............ 364/424.07 |
| 6,024,035 | A | 2/2000 | Flamme ...................... 111/178 |
| 6,070,539 | A | 6/2000 | Flamme et al. ............. 111/177 |
| 6,145,455 | A * | 11/2000 | Gust et al. .................. 111/178 |
| 6,463,866 | B2 | 10/2002 | Huffmeyer .................... 111/177 |
| 6,715,433 | B1 | 4/2004 | Friestad ...................... 111/177 |
| 6,729,250 | B2 | 5/2004 | Friestad et al. |
| 6,745,710 | B2 | 6/2004 | Friestad et al. ............. 111/178 |
| 7,185,596 | B2 * | 3/2007 | Thiemke et al. ............. 111/185 |

* cited by examiner

*Primary Examiner*—Christopher J. Novosad
(74) *Attorney, Agent, or Firm*—Taylor & Aust, P.C.

(57) ABSTRACT

An agricultural seeding machine includes at least one tool bar, and a plurality of row crop units, with each row crop unit coupled with a respective tool bar. Each row crop unit includes a seed meter; a ground engaging wheel; a continuously variable transmission (CVT) driven by the wheel; and a rotatable drive element coupled between the CVT and the seed meter.

23 Claims, 3 Drawing Sheets

GROUND DRIVEN SEED METERING SYSTEM WITH A CONTINUOUSLY VARIABLE TRANSMISSION

FIELD OF THE INVENTION

The present invention relates to agricultural seeding machines and more particularly to seed metering systems used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is movably coupled with a tool bar. The frame may carry a main seed hopper, herbicide hopper and insecticide hopper. If a herbicide and insecticide are used, the metering mechanisms associated with dispensing the granular product into the seed trench are typically relatively simple. On the other hand, the mechanisms necessary to properly meter the seeds, and dispense the seeds at predetermined relative locations within the seed trench are relatively complicated.

The mechanisms associated with metering and placing the seeds generally can be divided into a seed metering system and a seed placement system which are in series communication with each other. The seed metering system receives the seeds in a bulk manner from the seed hopper carried by the frame. Different types of seed metering systems may be used, such as seed plates, finger plates and seed disks. In the case of a seed disk metering system a seed disk is formed with a plurality of seed cells spaced about the periphery of the disk. Seeds are moved into the seed cells with one or more seeds in each seed cell depending upon the size and configuration of the seed cell. A vacuum or positive pressure air differential may be used in conjunction with the seed disk to assist in movement of the seeds into the seed cell. The seeds are singulated and discharged at a predetermined rate to the seed placement system.

The seed placement system may be categorized as a gravity drop system or a power drop system. In the case of the gravity drop system, a seed tube has an inlet end which is positioned below the seed metering system. The singulated seeds from the seed metering system merely drop into the seed tube and fall via gravitational force from a discharge end thereof into the seed trench. The seed tube may have a rearward curvature which reduces bouncing of the seed as it strikes the bottom of the seed trench.

Conventional techniques for providing rotary power to turn individual seed meters on each row unit of a seeding machine include: a central ground drive transmitted through complex shafting systems; hydraulic motors to turn a complex shafting system which in turn fans out to drive each seed meter; or an electric motor on each row unit to provide the rotational drive to control and drive the corresponding seed meter. Each of these approaches has some major cost, space, reliability, or control disadvantages. Mechanical rotary power transmission has many shafts, chains, bearings, and couplers to cross over frame flex and fold pivots. Individual control of seeding rates is not easily accomplished even with hydraulic drives. Electric motor drives are costly but do offer individual rate control including single row drive disconnects. A disadvantage of electric drives besides cost and generating enough electrical power to handle multiple row machines, is power cable handling and routing through the large machine space frames, across flex and fold pivots, etc.

What is needed in the art is a seeding machine with a seed metering system that allows individual control of the seed meters, while avoiding the disadvantages described above.

SUMMARY OF THE INVENTION

The invention in one form is directed to an agricultural seeding machine, including at least one tool bar, and a plurality of row crop units, with each row crop unit coupled with a respective tool bar. Each row crop unit includes a seed meter; a ground engaging wheel; a continuously variable transmission (CVT) driven by the wheel; and a rotatable drive element coupled between the CVT and the seed meter.

The invention in another form is directed to a method of controlling a seed meter in an agricultural seeding machine, including the steps of: driving a continuously variable transmission (CVT) with a ground engaging wheel; driving the seed meter with the CVT; and controlling a mechanical actuator associated with the CVT to adjust a driven rate of the seed meter.

DETAILED DESCRIPTION OF THE INVENTION

Figure 1:
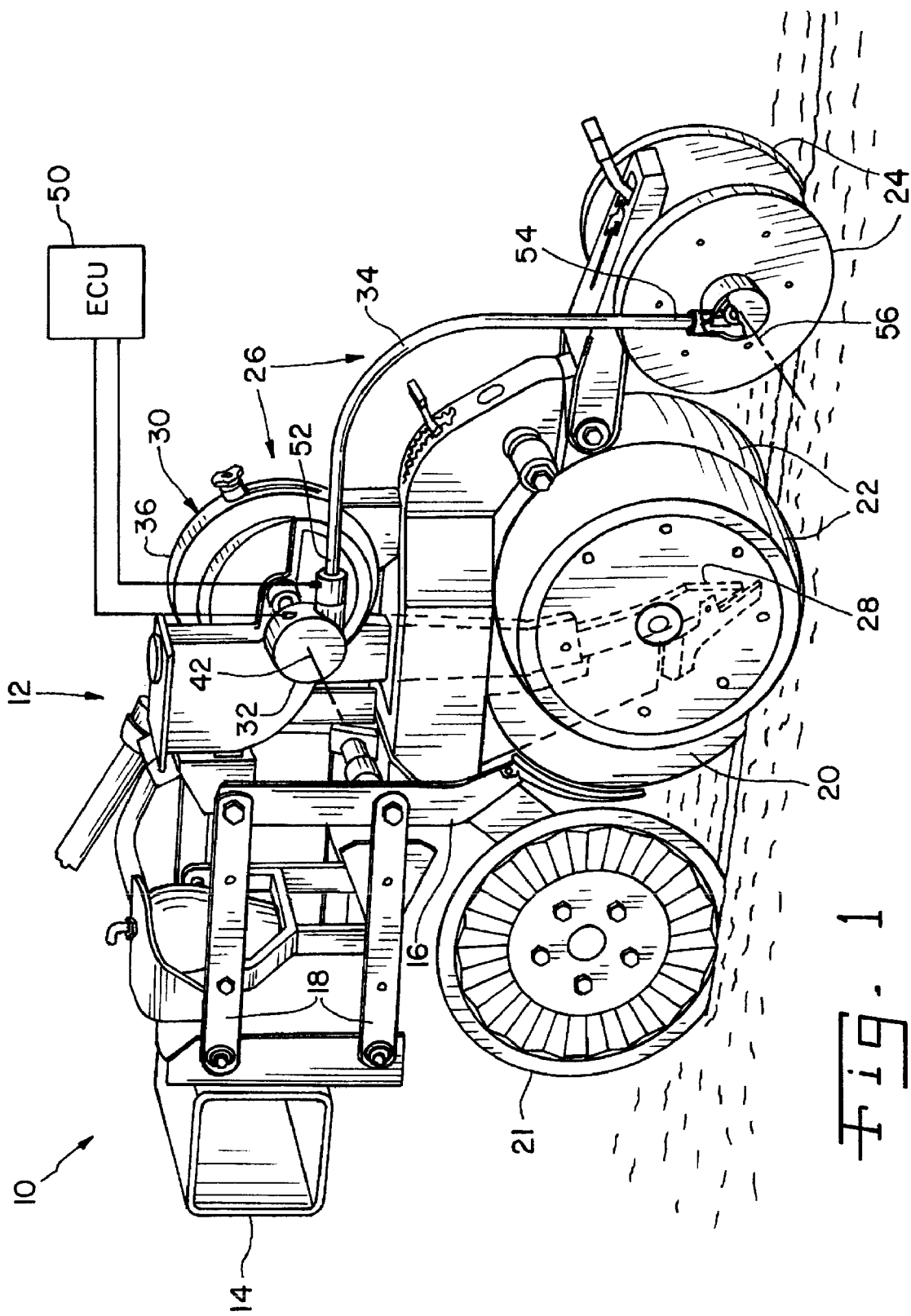
FIG. 1 is a perspective view of a row crop unit in an embodiment of an agricultural seeding machine of the present invention.
Figure 2:
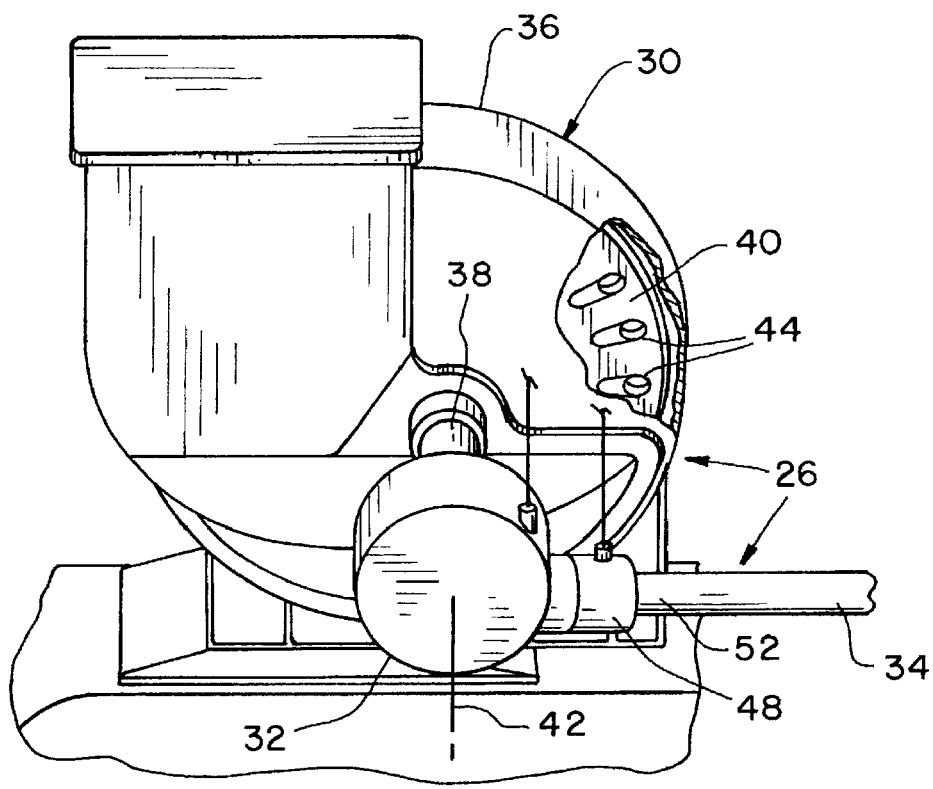
FIG. 2 is a perspective, fragmentary view of the seed metering system on the row crop unit of FIG. 1.

Referring now to the drawings, and more particularly to FIGS. 1 and 2, there is shown a portion of an embodiment of an agricultural seeding machine 10 of the present invention. In the embodiment shown, seeding machine 10 is in the form of a row crop planter but may also be in the form of a grain drill, etc. FIGS. 1 and 2 illustrate a single row crop unit 12 of a multi-row planter, with each row crop unit 12 being substantially identical and connected to a common tool bar 14. Only a single row crop unit 12 is shown and described below for simplicity sake.

Row crop unit 12 includes a multi-part frame 16 which is attached to tool bar 14 by parallel linkage 18. Tool bar 14 is coupled to a traction unit (not shown), such as an agricultural tractor. For example, tool bar 14 may be coupled to an agricultural tractor using a draw bar or 3-point hitch assembly. Tool bar 14 may be coupled with transport wheel assemblies, marker arms, etc. which may be of conventional design and not shown for simplicity sake.

Frame 16 carries a double disc furrow opener 20 for forming a seed trench in soil. An optional coulter wheel 21, particularly for use in no till situations, may be placed ahead of double disc furrow opener 20. A pair of gauge wheels 22 are respectively associated with the pair of discs of double disc furrow opener 20. More particularly, each gauge wheel 22 is positioned generally in line with and immediately adjacent to the outside of each respective disc of double disc furrow opener 20. Each gauge wheel 22 may be vertically adjusted to adjust the depth of the trench which is cut into the soil using double disc furrow opener 20.

A pair of closing wheels 24 are also carried by frame 16. Closing wheels 24 are positioned generally in line with double disc furrow opener 20. Closing wheels 24 are preferably biased in a downward direction and have a peripheral edge with a shape which may vary, depending upon the application.

A seed metering system 26 and a seed placement system 28 are also carried by frame 16. Seed placement system 28 is in the form of a gravity drop seed tube, but could be configured differently, such as a power drop seed placement system with a powered wheel, etc.

Seed metering system 26 generally includes a seed meter 30, a ground engaging wheel, a continuously variable transmission (CVT) 32, and a rotatable drive element 34. Seed metering system 26 receives seed from a main seed supply, such as seed from a distant main seed hopper which is supplied via air or the like, or a seed hopper carried above frame 16.

Seed meter 30 includes a housing 36 which rotatably carries a drive shaft 38, which in turn is concentrically coupled with and drives a seed disc 40. Drive shaft 38 has an axis of rotation 42 which also defines an axis of rotation of seed disc 40. Seed disc 40 has a plurality of seed cells 44 intermittently spaced about the periphery thereof. A vacuum source (not shown) applies vacuum pressure to seed cells 44 formed in seed disc 40. This vacuum pressure promotes entry of the seeds into seed cells 44 and maintains the seeds in place within seed cells 44. Seeds are transported from seed cells 44 to seed placement system 28. Of course, seed meter 30 may be configured with a positive pressure to assist in seed movement rather than a vacuum pressure.

In the embodiment shown, seed disc 40 is driven by a concentric drive shaft 38 as described above. However, seed disc 40 may also be rotatably driven by a drive mechanism which is engaged with the outer periphery thereof.

According to an aspect of the present invention, seed meter 30 is driven by a ground engaging wheel for that particular row unit. In contrast with a conventional seeding machine in which each seed meter is driven from a common drive shaft carried behind the tool bar, the present invention allows each seed meter 30 to be separately controlled for seed spacing on a row by row basis.

In the embodiment shown, seed meter 30 is driven by a ground engaging wheel in the form of a closing wheel 24. However, seed meter 30 can be driven by any ground engaging wheel which does not slip relative to the soil, such as a gauge wheel 22. Alternatively, a dedicated ground driven wheel (not shown) may be provided for rotatably driving a corresponding seed meter 30. It is not anticipated that seed meter 30 will be driven from double disc furrow opener 20 since the disc blades can slip somewhat when encountering trash on the soil surface, etc.

It is also possible to drive the individual seed meters of seeding machine 10 on a more localized basis, without driving each seed meter 30 with a separate ground engaging wheel. For example, it is possible to use one ground engaging wheel (e.g., closing wheel 24 or gauge wheel 22) to drive a pair of adjacent seed meters 30, thus providing localized control of seed spacing for every 2 row units.

CVT 32 may be of conventional design and is coupled with drive shaft 38 carrying seed disc 40. Alternatively, CVT 32 may be coupled with the outboard end of a shaft carrying closing wheel 24.

A CVT is defined as a transmission in which the ratio of the rotational speeds of two shafts, such as an input shaft and output shaft, can be varied continuously within a given range, providing an infinite number of possible ratios. In contrast with other mechanical transmissions which only allow a few different discrete gear ratios to be selected, a CVT has an infinite number of ratios available within a finite range, so it enables the relationship between the input shaft and the output shaft to be selected within a continuous range.

Different types of CVT's which may be used with the present invention include:
  an infinitely variable CVT;
  a ratcheting CVT;
  a variable diameter pulley CVT;
  a Reeves™ CVT;
  a roller based CVT;
  a hydrostatic CVT;
  a hydristor CVT;
  a Simkins™ ratcheting CVT; and
  a toric CVT.

Figure 3:
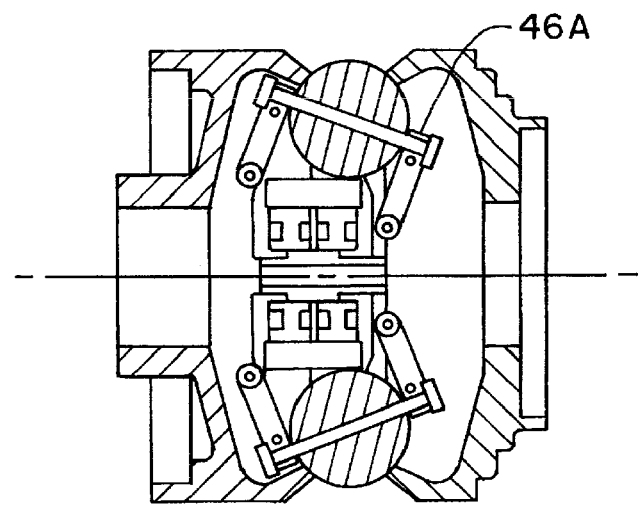
FIG. 3 is a side, sectional view of an embodiment of a CVT which can be used in the seed metering system of the present invention.

Such CVT's are known in the art and will not be described in greater detail herein. For a more detailed explanation of these various types of CVT's, as well as their general operation, reference is made to the discussion of CVT's at the website http://en.wikipedia.org/wiki/Continuously variable transmission. In one embodiment shown in FIG. 3, a particular type of infinitely variable CVT known as a NuVinci CVP may be adapted in principle with the present invention to provide a continuously variable input to output ratio between the ground speed of closing wheel 24 and the driven speed of seed disc 30. For a more detailed explanation of a NuVinci CVP, reference is made to the website http://www.fallbrooktech.com//NuVinci.asp.

Figure 4:
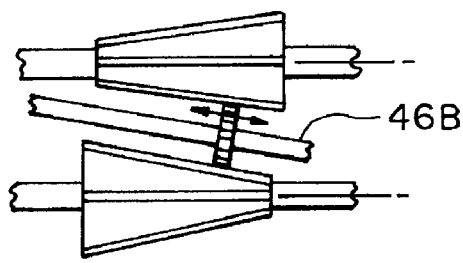
FIG. 4 is a side view of another embodiment of a CVT which can be used in the seed metering system of the present invention.
Figure 5:
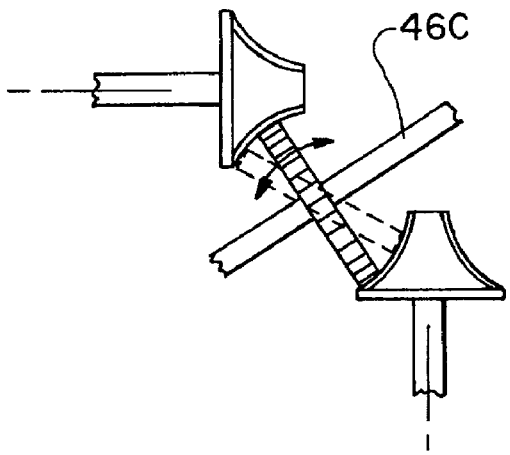
FIG. 5 is a side view of yet another embodiment of a CVT which can be used in the seed metering system of the present invention.

Regardless of the particular type of CVT utilized, the CVT includes a mechanical actuator 46 to adjust the rotational speed of seed disc 30. For example, referring to FIG. 3, a mechanical actuator 46A in the form of a set of rotating and tilting balls may be controllably positioned to vary the rotational speed of seed disc 30. As another example, referring to FIG. 4, a mechanical actuator 46B in the form of a pinion gear may be longitudinally positioned between two generally frustroconical shaped gears to vary the rotational speed of seed disc 30. As yet another example, referring to FIG. 5, a mechanical actuator 46C in the form of a pinion gear may be angularly positioned between two generally parabolic shaped gears to vary the rotational speed of seed disc 30.

CVT 32 also may include an integral clutch 48 for complete disengagement of seed disc 30, such as may occur using global position system (GPS) data for an end of field or point row condition. Clutch 48 may likewise be separate from CVT 32.

A controller (ECU) 50 is coupled with and independently controls mechanical actuator 46 of each CVT 32, and clutch 48. Controller 50 may be a dedicated controller or may be an onboard controller present on the work machine pulling seeding machine 10. Controller 50 may be any suitable combination of electronic hardware, software and/or firmware. Of course, each CVT 32 may also be adjusted manually and independently from one row crop unit 12 to the next, without the use of more sophisticated electronics.

Rotatable drive element 34 interconnects closing wheel 24 with seed disc 30, by way of intervening CVT 32. In the embodiment shown, rotatable drive element 34 is in the form of a flexible cable, but could be differently configured such as a flexible composite shaft, rigid shaft with universal joints, etc. Flexible cable 34 is similar in principle to the "Pro-Shaft" flexible drive cables driven by a common drive shaft on the Pro-Series XP planter which is manufactured and sold by the assignee of the present invention. Flexible cable 34 includes a first end 52 which is positioned approximately perpendicular to axis of rotation 42 of seed meter 30, and a second end 54 which is positioned approximately perpendicular to axis of rotation 56 of closing wheel 24.

During use, a selected seed type is received from a main seed supply at seed meter 30. The seed is maintained against a side of seed disc 40, and received within seed cells 44. To assist seed movement into seed cells 44, a vacuum pressure is applied to the opposite side of seed disc 40 using a suitable vacuum source. Of course, a positive pressure may also be applied to the side of seed disc 40 at which the seeds are disposed. Each seed meter 30 of each row crop unit 12 is independently driven using controller 50 which controllably actuates a corresponding clutch 48 and/or mechanical actuator 46. Controller 50 may receive other input signals used for the independent seed meter control, such as GPS signals, implement lift signals, end of row turn signals, etc. The seeds are discharged from seed meter 30 to seed placement system 28 at a predetermined rate. Closing wheels 24 close the seed trench and thereby cover the seed in the trench.

Figure 6:
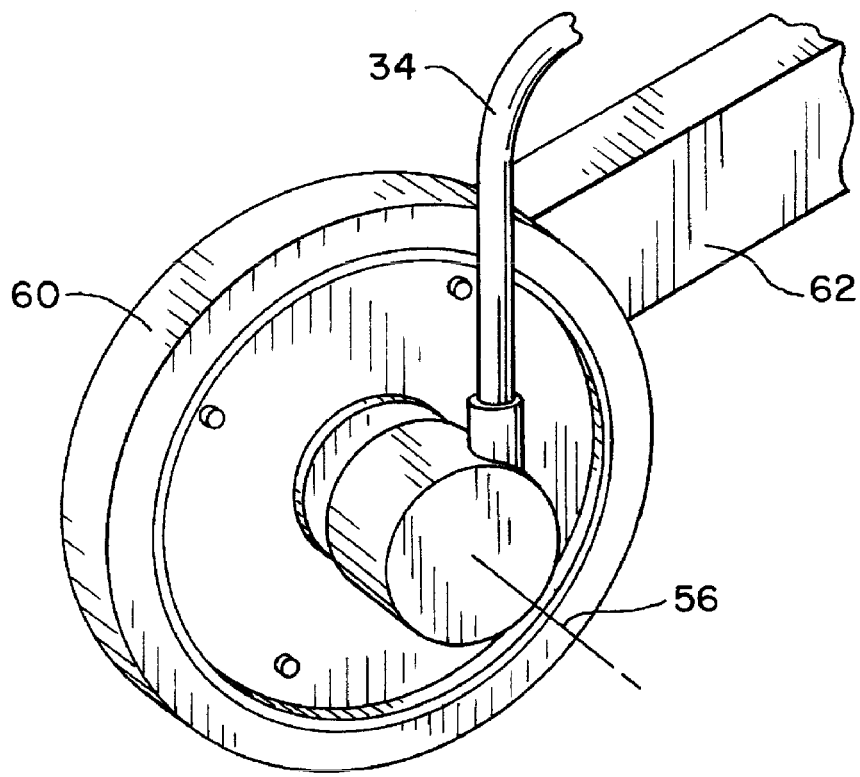
FIG. 6 is a perspective view of another embodiment of a single drive wheel which may be used with the row crop unit shown in FIG. 1.

FIG. 6 shows another embodiment of a wheel 60 which may be used with the row crop unit 12 shown in FIG. 1. Wheel 60 is in the form of a single wheel positioned behind gauge wheels 22, similar to the position of closing wheels 24 in FIG. 1. Wheel 60 functions more to press and firm the soil, rather than the two angled closing wheels 24 in FIG. 1 which are intended to collapse the side walls of the seed trench. Arm 62 is pivotally carried by frame 16 and biased in a downward direction using suitable structure such as springs, pneumatics, etc. Flexible cable 34 is driven by wheel 60 and rotatably drives seed disc 40.

The present invention uses seed meters which are driven by respective CVT's and provides the following non-inclusive advantages: relative low cost; low power requirements; modular concept, with each row unit the same; low cost repairs, with spare drive for one row; works with manual setting at each row or electronic control of all rows; has "limp home" capability; world wide application for high and low technology applications; automatic off/on when planter is raised or lowered; correct seeding rates on curves and contours; correct seeding rates when stopping or starting; no seed skips when stopping or starting; can be used with existing wheels or dedicated ground engaging drive wheels; and each seed meter can be checked by rotating the drive wheels by hand when the planter is in a raised position.

Having described the preferred embodiment, it will become apparent that various modifications can be made without departing from the scope of the invention as defined in the accompanying claims.

The invention claimed is:

1. An agricultural seeding machine, comprising:
   at least one tool bar; and
   a plurality of row crop units, each said row crop unit coupled with a respective said tool bar, each said row crop unit including:
      a seed meter supported by said row crop unit;
      a ground engaging wheel supported by said row crop unit;
      a rotatable drive element for coupling said drive wheel with said seed meter; and
      a continuously variable transmission (CVT) supported by said row crop unit and being interposed in said rotatable drive element for controlling the seed meter independently of seed meters in other row crop units.

2. The agricultural seeding machine of claim 1, wherein at least a portion of said rotatable drive element is a flexible drive element.

3. The agricultural seeding machine of claim 2, wherein said flexible drive element is a flexible cable.

4. The agricultural seeding machine of claim 3, wherein said seed meter and said wheel each have an axis of rotation, and said cable has a first end which is positioned approximately perpendicular to said seed meter axis of rotation, and a second end which is positioned approximately perpendicular to said wheel axis of rotation.

5. The agricultural seeding machine of claim 1, wherein said wheel comprises one of a closing wheel, a dedicated ground driven wheel, and a gauge wheel.

6. The agricultural seeding machine of claim 1, wherein said seed meter includes a seed disc, and said rotatable drive element drives said seed disk.

7. The agricultural seeding machine of claim 6, wherein said seed disc is carried by a shaft, and said rotatable drive element rotatably drives said shaft.

8. The agricultural seeding machine of claim 1, including a clutch associated with said CVT.

9. The agricultural seeding machine of claim 8, wherein said clutch is integral with said CVT.

10. The agricultural seeding machine of claim 1, wherein each said CVT is independently controllable from one said row crop unit to another said row crop unit.

11. The agricultural seeding machine of claim 10, including an electronic controller coupled with and independently controlling each said CVT.

12. The agricultural seeding machine of claim 1, wherein each said CVT comprises one of:
   an infinitely variable CVT;
   a ratcheting CVT;
   a variable diameter pulley CVT;
   a Reeves™ CVT;
   a roller based CVT;
   a hydrostatic CVT;
   a hydristor CVT;
   a Simkins™ ratcheting CVT; and
   a toric CVT.

13. A self-contained seed metering system in an agricultural seeding machine, comprising:
   a seed meter supported by a common frame;
   a ground engaging wheel supported by said common frame and substantially in line with said seed meter;
   a rotatable drive element for coupling said drive wheel with said seed meter; and
   a continuously variable transmission (CVT) supported by said common frame and being interposed in said rotatable drive element for control of said seed meter.

14. The seed metering system of claim 13, wherein at least a portion of said rotatable drive element is a flexible drive element.

15. The seed metering system of claim 14, wherein said flexible drive element is a flexible cable.

16. The seed metering system of claim 15, wherein said seed meter and said wheel each have an axis of rotation, and said cable has a first end which is positioned approximately perpendicular to said seed meter axis of rotation, and a second end which is positioned approximately perpendicular to said wheel axis of rotation.

17. The seed metering system of claim 13, wherein said wheel comprises one of a closing wheel, a dedicated ground driven wheel, and a gauge wheel.

18. The seed metering system of claim 13, wherein said seed meter includes a seed disc, and said rotatable drive element drives said seed disk.

19. The seed metering system of claim 18, wherein said seed disc is carried by a shaft, and said rotatable drive element rotatably drives said shaft.

20. The seed metering system of claim 13, including a clutch associated with said CVT.

21. The seed metering system of claim 20, wherein said clutch is integral with said CVT.

22. The seed metering system of claim 13, including an electronic controller coupled with and independently controlling said CVT.

23. The seed metering system of claim 13, wherein said CVT comprises one of:

an infinitely variable CVT;

a ratcheting CVT;

a variable diameter pulley CVT;

a Reeves™ CVT;

a roller based CVT;

a hydrostatic CVT;

a hydristor CVT;

a Simkins™ ratcheting CVT; and a toric CVT.

* * * * *

UNITED STATES PATENT AND TRADEMARK OFFICE
CERTIFICATE OF CORRECTION

| | | |
|---|---|---|
| PATENT NO. | : 7,735,438 B2 | Page 1 of 1 |
| APPLICATION NO. | : 11/868075 | |
| DATED | : June 15, 2010 | |
| INVENTOR(S) | : Paul R. Riewerts | |

It is certified that error appears in the above-identified patent and that said Letters Patent is hereby corrected as shown below:

COLUMN 5
       Line 66, after "said" please delete "drive" and insert --ground engaging--.

COLUMN 6
       Line 52, after "said" please delete "drive" and insert --ground engaging--.

Signed and Sealed this

Seventh Day of December, 2010

David J. Kappos
*Director of the United States Patent and Trademark Office*